Figure 1:
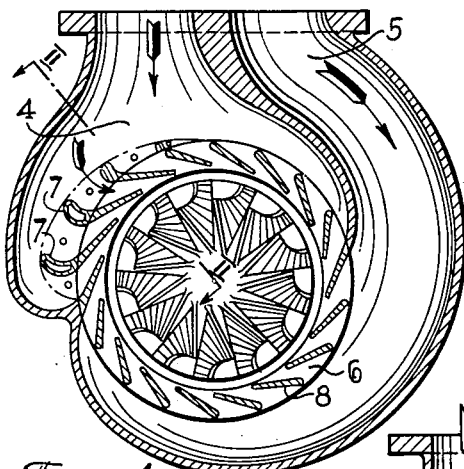

Oct. 24, 1961   A. J. BUCHI   3,005,618
TURBINE CASING
Filed May 12, 1958   2 Sheets-Sheet 1

Inventor
A. J. Buchi
By Hancock Downing Seebold
Attys

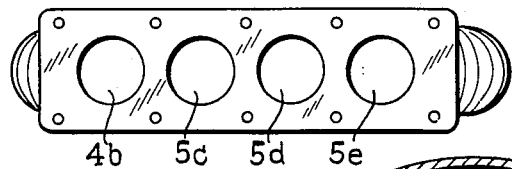
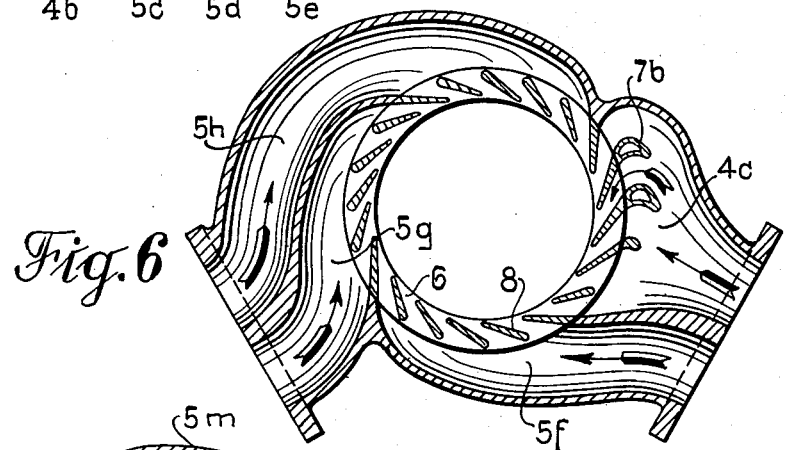
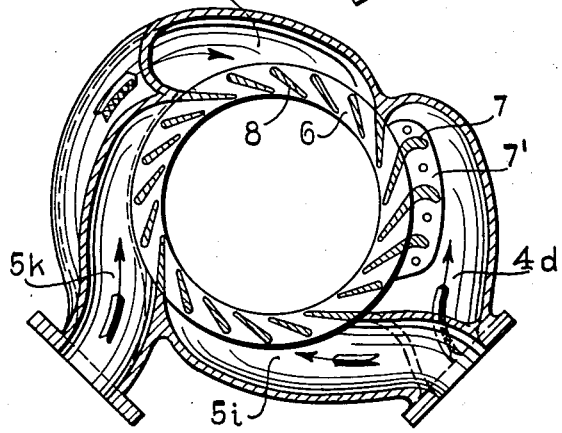
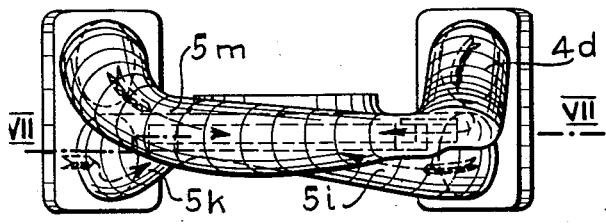

3,005,618
TURBINE CASING
Alfred J. Buchi, Archstrasse 2, Winterthur, Switzerland; Hermann Walder, executor of said Alfred Buchi, deceased
Filed May 12, 1958, Ser. No. 734,666
Claims priority, application Switzerland July 23, 1957
3 Claims. (Cl. 253—56)

This invention concerns casings for centripetal gas turbines wherein the gases for driving the turbine are supplied to a side of the casing and are conveyed therefrom to around the nozzle ring of the turbine by a plurality of conduits.

The present invention is characterised in that the conduits are so arranged that most of the gases approach the nozzle ring in the same direction as the direction of rotation of the rotor and in that the rest of the gases approach the nozzle ring in the opposite direction to the direction of rotation of the rotor, means being provided for deflecting said rest of the gases through the nozzle ring substantially in the direction of rotation of the rotor. Such an arrangement of the gas-conveying conduits provides a turbine casing of relatively small axial and radial dimensions although a plurality of separate conduits are provided to supply the turbine rotor. Furthermore the construction enables the gases to be delivered to around the complete periphery of the rotor in a uniform manner through guide vanes all of which are of the same shape. Since most of the gases are conveyed to the nozzle ring through conduits in the direction of rotation of the rotor only a relatively small amount of the gases require to be deflected before entering the nozzle ring. Consequently the losses incurred by the deflection of the gases is relatively small.

According to a feature of the present invention at least one of the conduits is arranged for conveying some of the gases supplied thereto towards the nozzle ring in the direction of rotor rotation and also for conveying the rest of the gases supplied to the conduit towards nozzle ring in the direction opposite to the direction of rotor rotation, said rest of the gases being directed by said deflector means into the nozzle ring.

In one arrangement the casing may have a single flange for the attachment of a gas duct for supplying all the gases to the conduits. Alternatively, however, the casing may have a plurality of flanges spaced circumferentially of the casing, each flange being for the attachment of a duct for supplying gases to some of the conduits. For example, according to a particular arrangement the casing may comprise a pair of attachment flanges which are inclined to one another. The provision of a plurality of separate attachment flanges facilitates the use of the turbine as part of a turbo-supercharger which is supplied with exhaust gases from an internal combustion engine. Thus, when the turbine casing comprises a pair of attachment flanges which are inclined to one another, the turbine is particularly adapted for use with an internal combustion engine having the cylinders in V formation.

According to yet a further feature the turbine casing has inlets to the conduits in an attachment flange, which inlets are side-by-side and spaced axially of the nozzle ring, the conduits being so arranged as to convey the gases from said flange into a common plane perpendicular to the nozzle ring axis. Such an arrangement is particularly useful when the gas-supply ducts are side-by-side and spaced axially relatively to the turbine.

Figures 2, 2A:
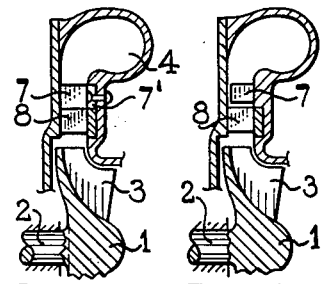
Figure 3:
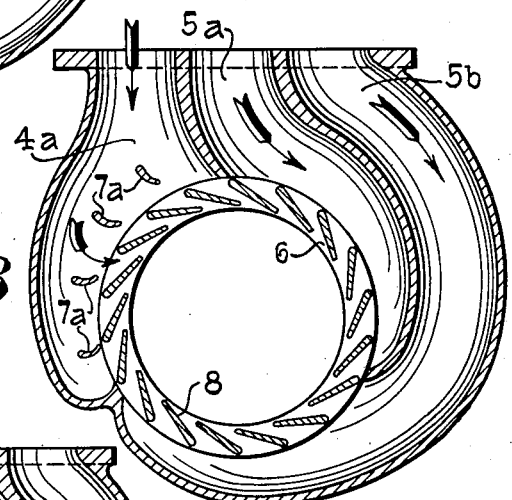
Figure 4:
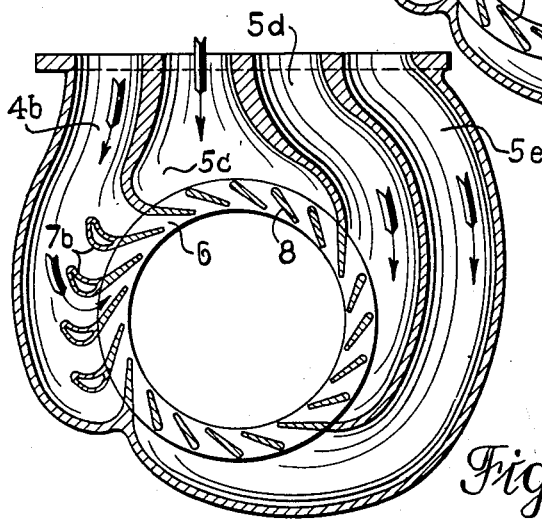
Figure 2B:
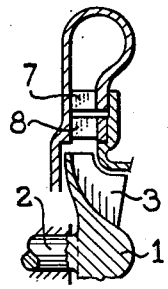

Practical applications of the present invention will now be described, by way of example only, with reference to the accompanying drawings whereof:

FIG. 1 is an end view, partly in section, of a centripetal gas turbine according to the present invention, FIG. 2, FIG. 2a and FIG. 2b are sectional elevations of a part of the turbine of FIG. 1 showing alternative details of construction, the section in each case being taken on the line II—II of FIG. 1, FIGS. 3 and 4 are views corresponding to FIG. 1 showing alternative constructions of turbines in accordance with this invention, FIG. 5 is a plan view of the turbine shown in FIG. 4, FIGS. 6 and 7 are similar views to FIG. 1 showing two further constructions of turbine according to this invention, FIG. 7 being a section on the line VII—VII of FIG. 8, and FIG. 8 is a plan view of the turbine of FIG. 7.

Referring to the drawings and particularly to FIGS. 1 and 2: the turbine rotor 1 is secured to a shaft 2, the rotor 1 comprising vanes 3 which extend axially of the rotor. Surrounding the rotor is a nozzle ring 6 having guide vanes 8 and gases are delivered in an inward radial direction through the nozzle ring 6 to the rotor 1.

The gases for driving the rotor 1 are delivered to around the nozzle ring 6 through a pair of conduits or guide ducts 4 and 5 each of which is connected to a common gas-supply duct.

As more clearly shown in FIG. 1 the conduit 5 is so arranged that the gases flow towards the nozzle ring 6 in the same direction as the direction of rotation of the rotor 1 and the gases pass through the guide vanes 8 into the rotor 1.

The conduit 4 on the other hand is so arranged that some of the cases passing therethrough flow towards the nozzle ring 6 along a path having a direction which is the same as that of the rotation of the rotor 1 while the remainder of the gases approach the nozzle ring along a path the direction of which is opposite to the direction of rotation of the rotor. The latter gases are deflected by the vanes 7 into the nozzle ring 6 in the same direction as the direction of rotation of the rotor 1 and substantially tangential to the rotor.

Of the total quantity of gas supplied to the turbine through conduits 4, 5 most is supplied in the direction of rotation of the rotor 1, the smaller amount of gases being supplied to the nozzle ring 6 through the conduit 4 in a direction opposite to the direction of rotation of the rotor 1 and being deflected by the vanes 7 so that it passes through the nozzle ring 6 in the same direction as the rest of the gases in the conduit 4 and of the gases in the conduit 5.

In FIG. 1 the deflecting vanes 7 are disposed so that one is provided for each of the vanes 8 and it is further arranged that the length of the deflecting vanes 7 increase as the length of the path of the gases through the conduit 4 increases. The chain dotted line shown in FIG. 1 clearly shows this. The entry tips of the vanes 7 lie on a spiral which diverges relatively to the nozzle ring periphery. The vanes 7 form an extension of the vanes 8 and abut therewith so that a composite vane 7, 8 is produced.

The inlets to the conduits 4 and 5 are in a common plane which is perpendicular to the axis of rotation of the rotor 1.

As shown in FIG. 2 the vanes 7 are carried by a segment ring 7' which is riveted to the wall of the turbine casing. In FIG. 2a the vanes 7 are integral with a single wall of the turbine casing while in FIG. 2b the vanes 7 are integral with a pair of opposite parallel walls of the casing.

Referring now to FIG. 3: the gases are supplied to the nozzle ring 6 through three conduits 4a, 5a and 5b. Each conduit supplies one-third of the arcuate surface of the nozzle ring 6 i.e. the same number of vanes 8 are associated with each conduit. In the conduit 4a most of the gas approaches the nozzle ring 6 in the direction opposite to the direction of rotation of the rotor and is deflected by the vanes 7a for admission to the nozzle ring 6 in the direction of rotation of the rotor while all the gases passing through the conduits 5a and 5b approach the nozzle ring 6 in the same direction as the direction of rotation of the rotor.

In FIG. 3 the deflector vanes 7a are spaced radially from, and are staggered peripherally of, the vanes 8, the discharge tips of the vanes 7a being directed towards the vanes 8. The number and arrangement of the vanes 7a is thus independent of the position and number of the vanes 8. Alternatively, however, only certain of the vanes 7a may be staggered peripherally relatively to the nozzle ring vanes 8.

Referring now to FIG. 4: the turbine comprises a casing having gas-supply conduits 4b, 5c, 5d and 5e. The deflecting vanes 7b are constructed similarly to FIG. 1, namely, they form direct extensions of the vanes 8 or are secured thereto. The conduits 5c, 5d and 5e are not provided with deflecting vanes. Obviously the conduit 5e has the longest gas path. All of the inlets to the conduits 4b, 5c, 5d and 5e of FIG. 4 are in a common plane, as is shown in FIG. 5, said plane being perpendicular to the axis of rotation of the rotor of the turbine i.e. perpendicular to the central axis of the nozzle rings.

In the constructions of FIGS. 1, 3 and 4 the turbine casing has a single attachment flange to receive a gas-supply duct. However, in FIG. 6 there is shown a construction in which the turbine casing is provided with two separate attachment flanges each of which is connected to a gas-supply duct. The faces of the pair of attachment flanges are inclined to one another. Conduits 4c and 5f are associated with one attachment flange and conduits 5g and 5h are associated with the other attachment flange. The conduit 4c provides the shortest gas path and this conduit is provided with deflector vanes 7b which form direct extension of the vanes 8. Alternatively, however, the deflecting vanes 7b may be constructed as described with reference to FIG. 3. All of the inlets to the four gas conduits are in a common plane which is perpendicular to the axis of rotation of the rotor of the turbine.

FIGS. 7 and 8 illustrate an arrangement similar to FIG. 6 wherein the casing is provided with a pair of flanges for attachment to the gas-supply duct, the faces of the flanges being inclined to one another. A pair of conduits are associated with each flange, thus, as more clearly shown in FIG. 8, the channels 5k, 5m are associated with the left-hand flange and the channels 4d and 5i are associated with the right-hand flange. The inlets to the channels 5k, 5m are spaced on their flange axially of the rotor or nozzle ring and a similar disposition is provided for the channels 4d, 5i. The channels extend from their attachment flanges circumferentially and axially so that in the region of the nozzle ring 6 the four channels are in a common plane which is perpendicular to the axis of rotation of the rotor.

Deflector vanes 7 are provided in the channel 4d for the purpose described above. The deflecting vanes 7 are secured to a segment ring 7' which is attached to the casing in the manner illustrated in FIG. 2. The deflecting vanes 7 of the construction of FIG. 7 may be arranged in accordance with any of the alternative constructions described above.

The wall of the channel 4 or 4a or 4b or 4c or 4d is arranged appropriately to direct the gases towards the guide vanes 8.

What I claim is:

1. A gas inlet casing for a radial inflow turbine having a rotor provided with blading located therein, said casing comprising an outer wall and intermediate partition walls, said outer wall and intermediate partition walls defining at least two individual guide ducts for an incoming actuating gas arranged side by side in a plane passing through the inlet of the rotor blading and disposed substantially normal to the axis of rotation, a unitary nozzle ring ahead of said rotor blading for and adjoining said guide ducts, said nozzle ring having a plurality of guide blades, said partition walls and outer wall joining the guide blades defining said nozzle ring in the direction of rotation of the rotor, an inlet and outlet for the gas to and from said guide blades, said guide blades from said inlet to said outlet being of equal shape and equal direction relative to the direction of rotation of said rotor, each guide duct terminating at and embracing a section of the periphery of said nozzle ring, said guide ducts being so arranged that in one of said ducts the gas approaches at least a partial number of the guide blades of said nozzle ring in a direction opposed to the direction of rotation of the rotor, and in the remaining guide ducts the gas approaches all of the guide blades of said nozzle ring in the direction of rotation of said rotor, and deflecting blades separate from said guide blades, said deflecting blades being connected across said guide blades inlet to opposite parts of the wall of said one guide duct, said deflecting blades guiding the actuating gas in the direction of and into the guide blades of said nozzle ring.

2. A gas inlet casing for a radial inflow turbine having a rotor provided with blading located therein, said casing comprising means defining at least two individual guide ducts for an incoming actuating gas arranged side by side in a plane passing through the inlet of the rotor blading and disposed substantially normal to the axis of rotation, a unitary nozzle ring ahead of said rotor blading for and adjoining said guide ducts, said nozzle ring having a plurality of guide blades, an inlet and outlet for the gas to and from said guide blades, said guide blades from said inlet to said outlet being of equal shape and equal direction relative to the direction of rotation of said rotor, each guide duct terminating at and embracing a section of the periphery of said nozzle ring, said guide ducts being so arranged that in one of said ducts the gas approaches at least a partial number of the guide blades of said nozzle ring in a direction opposed to the direction of rotation of the rotor, and in the remaining guide ducts the gas approaches all of the guide blades of said nozzle ring in the direction of rotation of said rotor, deflecting blades separate from said guide blades, said deflecting blades being connected across said guide blades inlet to opposite parts of the wall of said one guide duct, said deflecting blades guiding the actuating gas in the direction of and into the guide blades of said nozzle ring, said deflector blades adjoining the guide blades of said nozzle ring and the lengths of said deflector blades increasing as the gas conveyor path increases.

3. A gas inlet casing for a radial inflow turbine having a rotor provided with blading located therein, said casing comprising means defining at least two individual guide ducts for an incoming actuating gas arranged side by side in a plane passing through the inlet of the rotor blading and disposed substantially normal to the axis of rotation, a unitary nozzle ring ahead of said rotor blading for and adjoining said guide ducts, said nozzle ring having a plurality of guide blades, an inlet and outlet for the gas to and from said guide blades, said guide blades from said inlet to said outlet being of equal shape and equal direction relative to the direction of rotation of said rotor, each guide duct terminating at and embracing a section of the periphery of said nozzle ring, said guide ducts being so arranged that in one of said ducts the gas approaches at least a partial number of the guide blades of said nozzle ring in a direction opposed to the direction of rotation of the rotor, and in the remaining guide ducts the gas approaches all of the guide blades of said nozzle ring in the direction of rotation of said rotor, deflecting blades separate from said guide blades, said deflecting blades being connected across said guide blades inlet to opposite parts of the wall of said one guide duct, said deflecting blades guiding the actuating gas in the direction of and into the guide blades of said nozzle ring, said deflector blades adjoining the guide blades of said nozzle ring and having outer edges, and said outer edges lying on a spiral-like curve with respect to the circumference of the nozzle ring.

References Cited in the file of this patent

UNITED STATES PATENTS

| 146,068 | Hamilton | Dec. 30, 1873 |
| 2,577,179 | Buchi | Dec. 4, 1951 |

FOREIGN PATENTS

| 376,662 | Italy | Nov. 22, 1939 |

OTHER REFERENCES

Germany (patent application—K1 46f Gp5 01), D207 18 Ia, September 6, 1956.